United States Patent
Schlags

(10) Patent No.: US 10,359,073 B2
(45) Date of Patent: Jul. 23, 2019

(54) WHEEL BEARING AND HUB SYSTEM

(71) Applicant: Michael Schlags, Buellton, CA (US)

(72) Inventor: Michael Schlags, Buellton, CA (US)

( * ) Notice: Subject to any disclaimer, the term of this patent is extended or adjusted under 35 U.S.C. 154(b) by 154 days.

(21) Appl. No.: 15/624,136

(22) Filed: Jun. 15, 2017

(65) Prior Publication Data

US 2018/0363699 A1    Dec. 20, 2018

(51) Int. Cl.
| | |
|---|---|
| *F16C 19/06* | (2006.01) |
| *F16C 19/54* | (2006.01) |
| *F16C 19/18* | (2006.01) |
| *F16C 33/12* | (2006.01) |
| *B60B 27/00* | (2006.01) |
| *F16C 35/077* | (2006.01) |
| *F16C 19/04* | (2006.01) |

(52) U.S. Cl.
CPC .......... *F16C 19/06* (2013.01); *B60B 27/0005* (2013.01); *F16C 19/04* (2013.01); *F16C 19/184* (2013.01); *F16C 19/54* (2013.01); *F16C 33/12* (2013.01); *F16C 35/077* (2013.01); *F16C 2226/76* (2013.01); *F16C 2226/78* (2013.01); *F16C 2326/02* (2013.01)

(58) Field of Classification Search
CPC .......... F16C 19/06; F16C 33/12; F16C 19/54; F16C 19/184
USPC .................................... 301/5.301, 5.7, 5.309
See application file for complete search history.

(56) References Cited

U.S. PATENT DOCUMENTS

| | | | | |
|---|---|---|---|---|
| 5,301,778 | A * | 4/1994 | Haeussinger | B60B 27/023 192/64 |
| 5,678,582 | A * | 10/1997 | McClure | A63C 17/0006 134/116 |
| 6,017,097 | A | 1/2000 | Weir, III | |
| 6,612,658 | B1 * | 9/2003 | Oumedian | B60B 37/10 16/47 |
| 6,644,757 | B2 * | 11/2003 | Lew | B60B 1/041 301/105.1 |
| 6,866,422 | B2 | 3/2005 | Griseri et al. | |
| 7,922,262 | B2 | 4/2011 | Savarese et al. | |
| 8,297,631 | B2 | 10/2012 | Siebeneick et al. | |
| 8,382,213 | B2 * | 2/2013 | De Freitas | B60B 27/001 188/218 XL |
| 8,777,329 | B2 * | 7/2014 | Werries | B60B 27/0005 29/898.061 |
| 9,370,968 | B2 | 6/2016 | Spahr et al. | |

* cited by examiner

*Primary Examiner* — S. Joseph Morano
*Assistant Examiner* — Jean W Charleston

(57) ABSTRACT

A wheel bearing and hub system (WBHS) that functions to facilitate a vehicle wheel hub and tire to rotate with an axle. The WBHS includes a wheel bearing assembly and a wheel hub. The bearing assembly has an outer member with inward extending slots and an inner member that is located and secured within the outer member. The inner member has an outer race, an inner race, a plurality of ball bearings and a retainer within a channel between the hub races, and a center opening. The wheel bearing assembly is inserted into the center of the wheel hub, which has a front member and a rear member. An axle is then inserted into and attached within the channel, thereby facilitating the rotation of the axle and wheel hub.

13 Claims, 6 Drawing Sheets

WHEEL BEARING AND HUB SYSTEM

TECHNICAL FIELD

The invention generally pertains to vehicle wheels, and more particularly to a wheel bearing and hub system that facilitates the rotation of an axle along with a vehicle wheel hub and tire.

BACKGROUND ART

Arguably, one of the greatest inventions of all-time is the wheel. The impact of the wheel on human development has been tremendous. The wheel has been responsible for allowing many of functions and activities that are taken for granted today, including travel and commerce. Amazingly, the basic design and function of the wheel has not changed since it was initially developed.

Of course, as technology and materials have improved the capabilities and functionality of the wheel have also improved. For example, vehicle wheels are now able to withstand greater forces, and to perform for longer periods of time.

One important element of wheel technology that has improved overtime, and has had a significant impact on wheel functionality has been the design and type of wheel and axle interface. The ability of a wheel, or wheel and tire, to rotate with the best efficiency depends on the combined actions of the wheel and axle.

One of the best developments was to introduce the use of bearings to create smooth, efficient rotation of a wheel on an axle. Bearings are especially well-suited for this use, however there are problems associated with the use of bearings. One problem is that the constant rotation of the bearings can cause them to wear down. The actual design of a bearing based system requires careful consideration of dimensions and ratios. Also, the use of relatively weak materials, such as plastic can result in decreased performance.

What is needed is a wheel bearing assembly that is well designed and utilizes high-grade materials. Optimally, the ball bearings and the housing would be made of stainless steel. By providing the stainless steel on stainless steel interface, a wheel bearing system could take greater loads at higher speeds, and could operate for an extended period of time.

A search of the prior art did not disclose any literature or patents that read directly on the claims of the instant invention. However, the following U.S. patents are considered related:

| PATENT NO. | INVENTOR | ISSUED |
|---|---|---|
| U.S. Pat. No. 6,644,757 | Curcio et al | Feb. 4, 2014 |
| U.S. Pat. No. 7,922,262 | Savarese et al | Apr. 12, 2011 |
| U.S. Pat. No. 8,382,213 | DeFreitas | Feb. 26, 2013 |

The U.S. Pat. No. 6,644,757 discloses a wheel hub that allows a wheel to be free-wheeling in both directions of turning and is constructed to provide low rolling resistance, greater load carrying capacity and is more reliable that earlier hubs. The hub includes separate bearing systems for supporting radial loads as perpendicular to a road surface, and axial loads as are side loads directed into the hub. The bearing systems include a pair of radial bearings for supporting radial loads, with each radial bearing of the pair mounted at each hub end to receive an axle fitted therethrough, and a pair of thrust bearings for supporting axial loads, with each thrust bearing of the pair mounted at a hub end.

The U.S. Pat. No. 7,922,262 discloses a bearing wheel hub unit that is provided with a mounting flange which is integral with an inner race of the bearing in order to mount a wheel A centering collar extends from a frontal surface of the flange to permit the centering of the wheel in relation to the unit. The centering collar is independent of the mounting flange and is assembled with the flange by fixing onto the frontal surface.

The U.S. Pat. No. 8,382,213 discloses a wheel hub assembly that is fitted to a vehicle axle via a wheel bearing mounted on the axle. The assembly includes a hub mountable on the wheel bearing and rotatable relative to the vehicle axle and fastening members to releasably secure the hub relative to the wheel bearing.

For background purposes and indicative of the art to which the invention relates, reference may be made to the following remaining patents found in the patent search.

| PATENT NO. | INVENTOR | ISSUED |
|---|---|---|
| U.S. Pat. No. 6,017,097 | Weir III | Jan. 25, 2000 |
| U.S. Pat. No. 6,866,422 | Griseri et al | Mar. 15, 2005 |
| U.S. Pat. No. 8,297,631 | Siebeneick et al | Oct. 30, 2012 |
| U.S. Pat. No. 9,370,968 | Spahr et al | Jun. 21, 2016 |

DISCLOSURE OF THE INVENTION

The wheel bearing and hub system (WBHS) functions to facilitate the rotation of a vehicle wheel, tire and axle. In its basic design, the WBHS is comprised of a circular wheel bearing assembly and a wheel hub. The wheel bearing assembly has an outer member and an inner member. The outer member is designed to be secured into a bearing assembly seat in the hub. The inner member which is press-fit into the outer member has an outer race and an inner race with an opening through the inner race. Between the two races is a bearing channel within which are a plurality of ball bearings and a retainer. A tire is then placed onto the wheel hub. The WBHS is optimized for use with an inflatable rubber tire, known as a balloon wheel, such as a tire manufactured by WheelEez. Alternately, the WBHS can also be used with other types of tires by various manufacturers.

The WBHS can be secured onto a conventional vehicle wheel by bolts that are inserted into openings on the wheel bearing assembly outer member and the wheel hub. The bolts pass through the openings on the wheel hub and are secured by a nut on each bolt at the rear of the vehicle wheel. An alternate wheel design is a two-piece wheel, with a front section and a rear section such as that utilized for an inflatable rubber tire. When a two-piece wheel is utilized, the WBHS is designed to secure both sections of the wheel along with the WBHS.

Preferably, a single WBHS is utilized for a single vehicle wheel. If desired, and/or required two WBHSs can be utilized, with one at the front and one at the rear. When only one WBHS is utilized at the front, a rear attachment member can be placed at the rear to provide optimal securement of the WBHS on the wheel.

Once the WBHS is secured on a wheel, an axle is inserted through an opening on the wheel bearing assembly's inner member. As the ball bearings circumnavigate within the channel, the axle, wheel hub and tire rotate.

Both the ball bearings and the inner race are made of stainless steel. This stainless steel on stainless steel interface produce a much stronger and long-lasting functionality. The WBHS replaces conventional plastic wheel bearing and hub systems with a proprietary metal design that is permanently assembled by press-fit and which is capable of taking greater loads and operating at higher speeds for longer durations of time.

In view of the above disclosure, the primary object of the invention is to provide an improved wheel bearing and hub system that offers significantly improved functionality and performance over previous or conventional related devices.

In addition to the primary object, it is also an object of the invention to produce a wheel bearing and hub system that:
is made of metal,
is durable,
is easy to install,
requires little or no maintenance,
can be used on a variety of vehicle wheels,
can provide a smoother ride especially after long durations of time,
can be sold as an OEM product or as an aftermarket product,
is user installable,
is easy to remove if necessary, and
is cost effect from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms that disclose a preferred embodiment of a wheel bearing and hub system (WBHS). A typical configuration of a wheel assembly consists of two wheels (with attached tires) that are secured an each end of an axle. As the axle rotates, either by power or without power, the wheels also rotate. This configuration has been in use since the invention of the wheel. As time, technology and innovation has progressed new design configurations have emerged. One design configuration is the addition of a hub that is located on a wheel and that interfaces with the axle. There are multiple hub designs, with the goal being to provide a more durable and longer-lasting assembly that provides a better ride.

A particular hub design utilizes ball bearings to produce a smooth and effective rotation of a wheel. The WBHS provides an improved ball bearing design to provide an assembly that can take greater loads and function for a greater duration of time than other conventional hub designs.

The WBHS 10, as shown in FIGS. 1-11, functions to facilitate the rotation of a wheel hub along with a tire and an axle. The wheel hub commonly used for the WBHS is a two-piece design, with a front section and a rear section. It should be noted that while a two-piece wheel is the most commonly used, the WBHS can also be effectively utilized on a one-piece wheel or other wheel designs. Also, the design of the WBHS 10 provides bi-directional wheel rotation, and typically does not utilize power. However, the WBHS 120 can be adapted for use with power if required.

Figure 3:
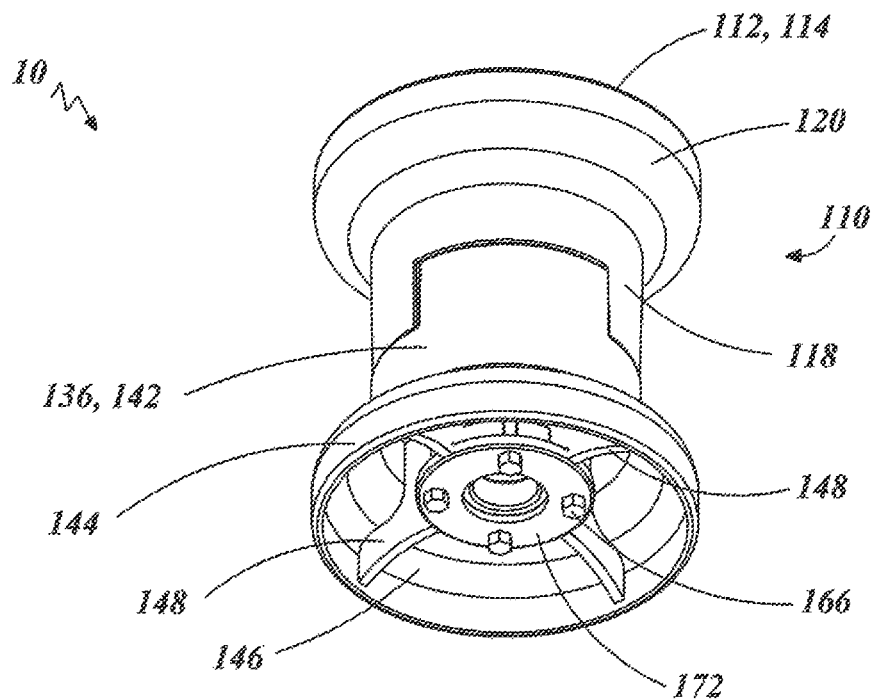
FIG. 3 is an orthographic rear view the WBHS.
Figure 5:
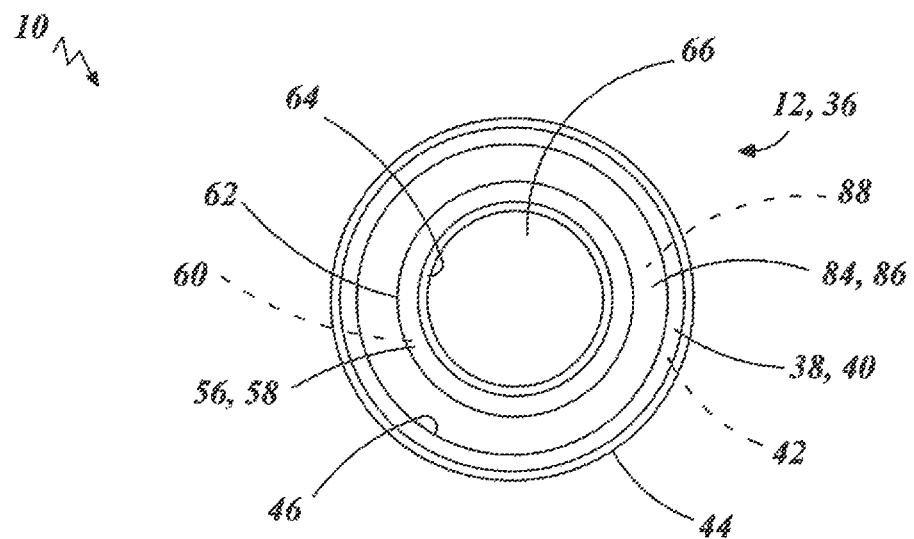
FIG. 5 is a front elevational view of the WBHS bearing assembly's inner member.
Figure 4:
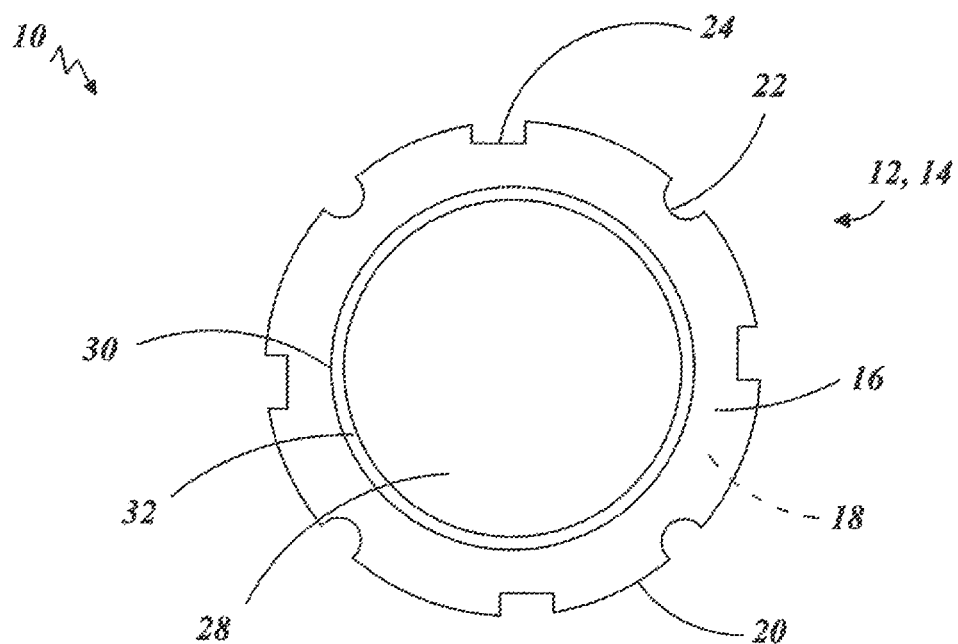
FIG. 4 is a front elevational view of the WBHS bearing assembly's outer member.
Figure 6:
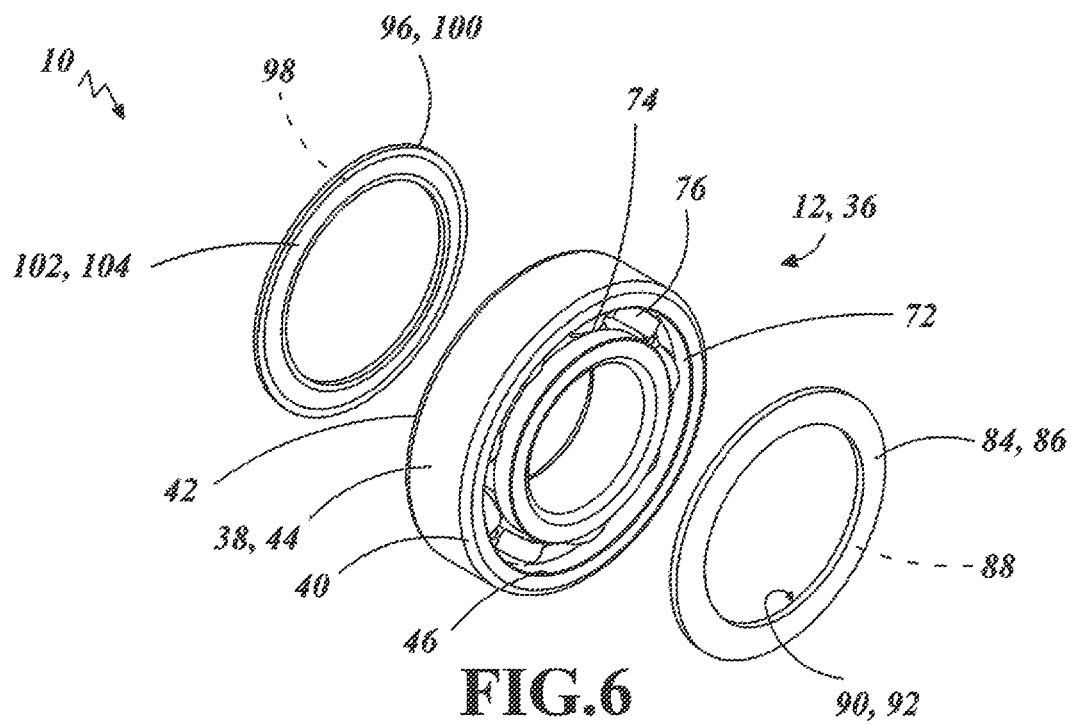
FIG. 6 is an orthographic view of the WBHS inner member with a front channel cover and a rear channel cover removed.
Figure 7:
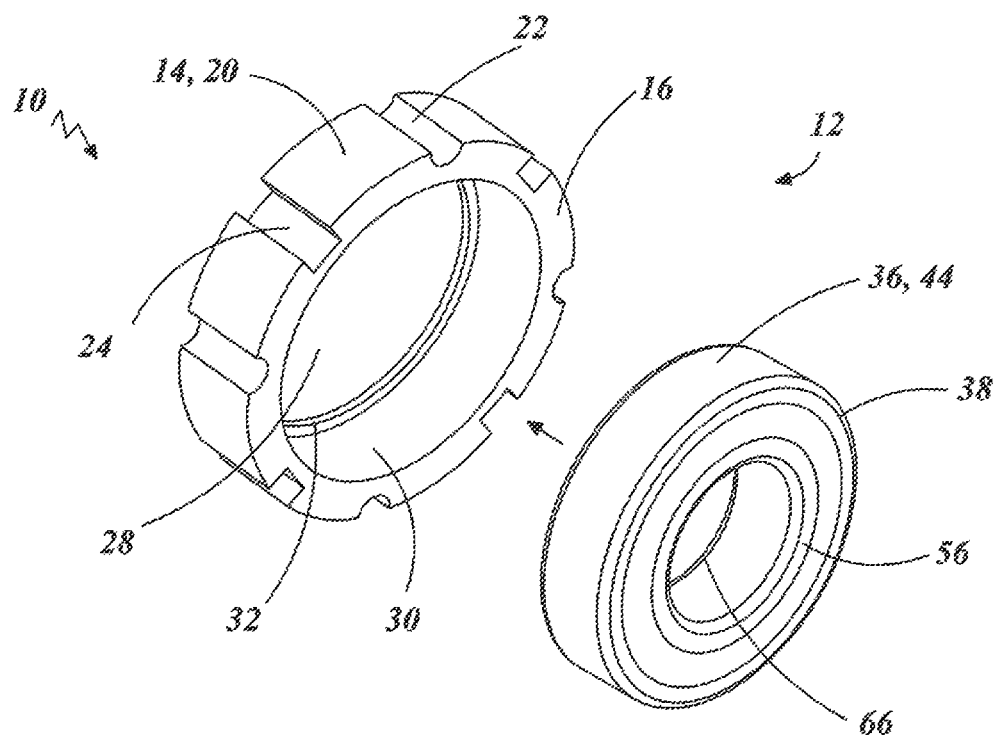
FIG. 7 is an orthographic view of the WBHS inner member prior to being press-fit into the outer member.
Figure 8:
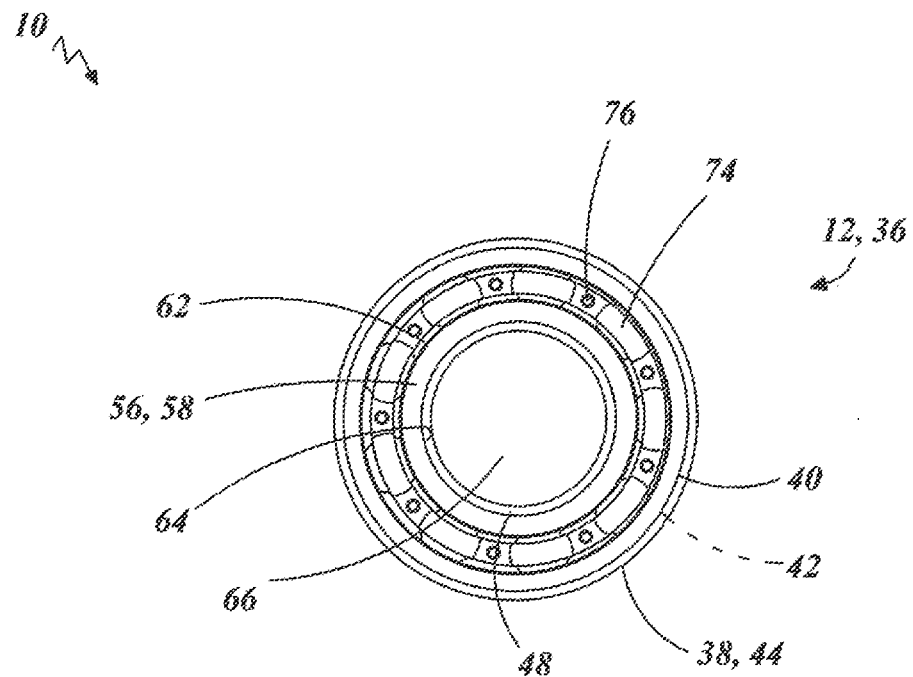
FIG. 8 is a front elevational view of the WBHS bearing assembly's inner member with the front cover removed and showing ball bearings and a retainer within a channel, and a center opening.
Figure 9:
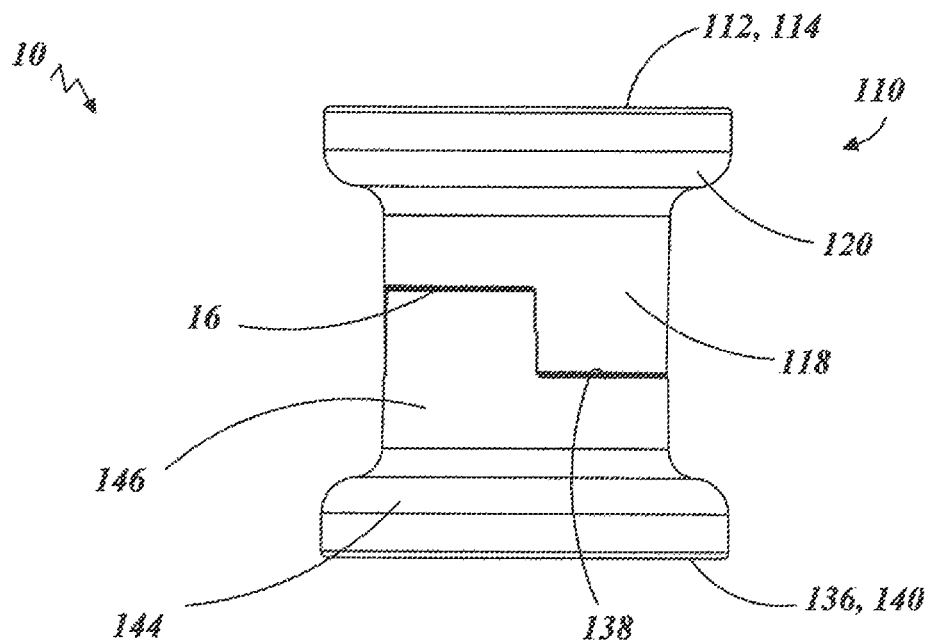
FIG. 9 is a side elevational view of the WBHS wheel hub with a front member and a rear member fitted together.

As shown in FIGS. 1-11, the WBHS 10 is comprised of two major elements: a wheel bearing assembly 12 and a wheel hub 110. The wheel bearing assembly 12, as shown in FIGS. 3-8, is preferably circular, but can be other shapes as well, and is made of metal. The WBHS 10 includes:

a) the wheel bearing assembly 12 comprising:
  1) an outer member 14, as shown in FIGS. 3-4 and 7, that is dimensioned to be inserted and secured into the wheel hub 110. The outer member 14 has a front surface 16, a rear surface 18, an outer perimeter surface 20 having a plurality of U-shaped slots 22 and a plurality of square-shaped slots 24 and an opening 28 having a perimeter surface 30 and a perimeter flange 32, and
  2) an inner member 36, as shown in FIGS. 3 and 5-8, that is secured within the opening 28 on the outer member, as shown in FIG. 7, with the inner member kept from continuing through the outer member by means of a perimeter flange on the outer member opening, and has:
    a)) an outer race 38, as shown in FIGS. 3 and 5-8 with a front surface 40, a rear surface 42, an outer perimeter surface 44, an inner perimeter surface 46, and a stepped section 48,
    b)) an inner race 56, as shown in FIGS. 3 and 5-8, having a front surface 58, a rear surface 60, an outer perimeter surface 62, an inner perimeter surface 64, and an opening 66,
    c)) a bearing channel 72, as shown in FIGS. 6 and 8, that circumvents the inner member 36 of the wheel bearing and hub system between the outer race 38 and the inner race 56, and maintains a plurality of ball bearings 74 and a retainer 76 The ball bearings allow the inner race 76 to rotate,
    d)) a front channel cover 84, as shown in FIGS. 5-7, with an outer surface 86, an inner surface 88 and a circular slot 90 into which is placed a metallic ring 92. The front channel cover 84 is press fit onto and over the bearing channel 72 on the front,
    e)) a rear channel cover 96, as shown in FIG. 6, with an outer surface 98, an inner surface 100, and a circular slot 102 into which is placed a metallic ring 104. The rear channel cover is press fit onto and over the bearing channel 72 on the rear, and b) the wheel hub 110, as shown in FIGS. 1-3 and 9-11, comprises a front member 112 and a rear member 136. The front member 112 has a front surface 114, a rear surface 116, an outer perimeter surface 118, and a front flanged section 120 having a cavity 124 therein. Located at the substantial center within the cavity 124 is a bearing assembly seat 128 with four radial arms 126 that extend form the assembly seat 128 to an inner surface of the cavity 124. Circumventing the assembly seat 128 are slots 130 and openings 132 that correspond to the slots 22,24 on the wheel bearing assembly outer member 14. The rear member 136 is a mirror image of the front member 110 and the front and rear members are fitted together by means of interfacing the rear surface 116 of the front member 112 to the front surface 138 of the rear member 136. The rear member 136 has a front surface 138, a rear surface 140, an outer perimeter surface 142, and a rear flanged section 144 having a cavity 146 therein. Located at the substantial center of the cavity 146 is a rear attachment member seat 150 with four radial arms 148 that extend from the attachment member seat 150 to an inner surface of the cavity 146. Circumventing the attachment member seat 150 are slots 152 and openings 154 that correspond to the slots, on the front member 112. The wheel bearing assembly 12 is dimensioned to fit into the bearing assembly seat 128 with the assembly seat slots 132 corresponding with and fitting into the square-shaped slots 24 on the outer member and the assembly seat openings 132 aligned with the U-shaped slots 22 on the outer member 14. A front cover plate 168 is placed on the front surfaces 16 of the wheel bearing assembly 12. The front cover plate 168 has openings 170 corresponding to the U-shaped slots 22 on the bearing assembly outer member 14. A rear cover plate 172 is placed on a rear surface of the rear attachment member 158. The rear cover plate 172 has openings 174 that correspond to the openings 162 in the rear attachment member 158. A bolt 166 is inserted sequentially into and through the front cover plate 168, the U-shaped slots 22 on the bearing assembly outer member 14, the hub front member 112, the hub rear member 136, the rear attachment member 158, and the rear cover plate 172. A nut is secured onto an end of each bolt 166, thereby securing the WBHS together. An axle is inserted into and secured within the inner member opening 66 on the wheel bearings assembly 12. The ball bearings 74 circumnavigate within the channel 72, thereby facilitating the rotation of the WBHS 10 and the wheel hub 110 with the rotation of the axle.

Figure 1:
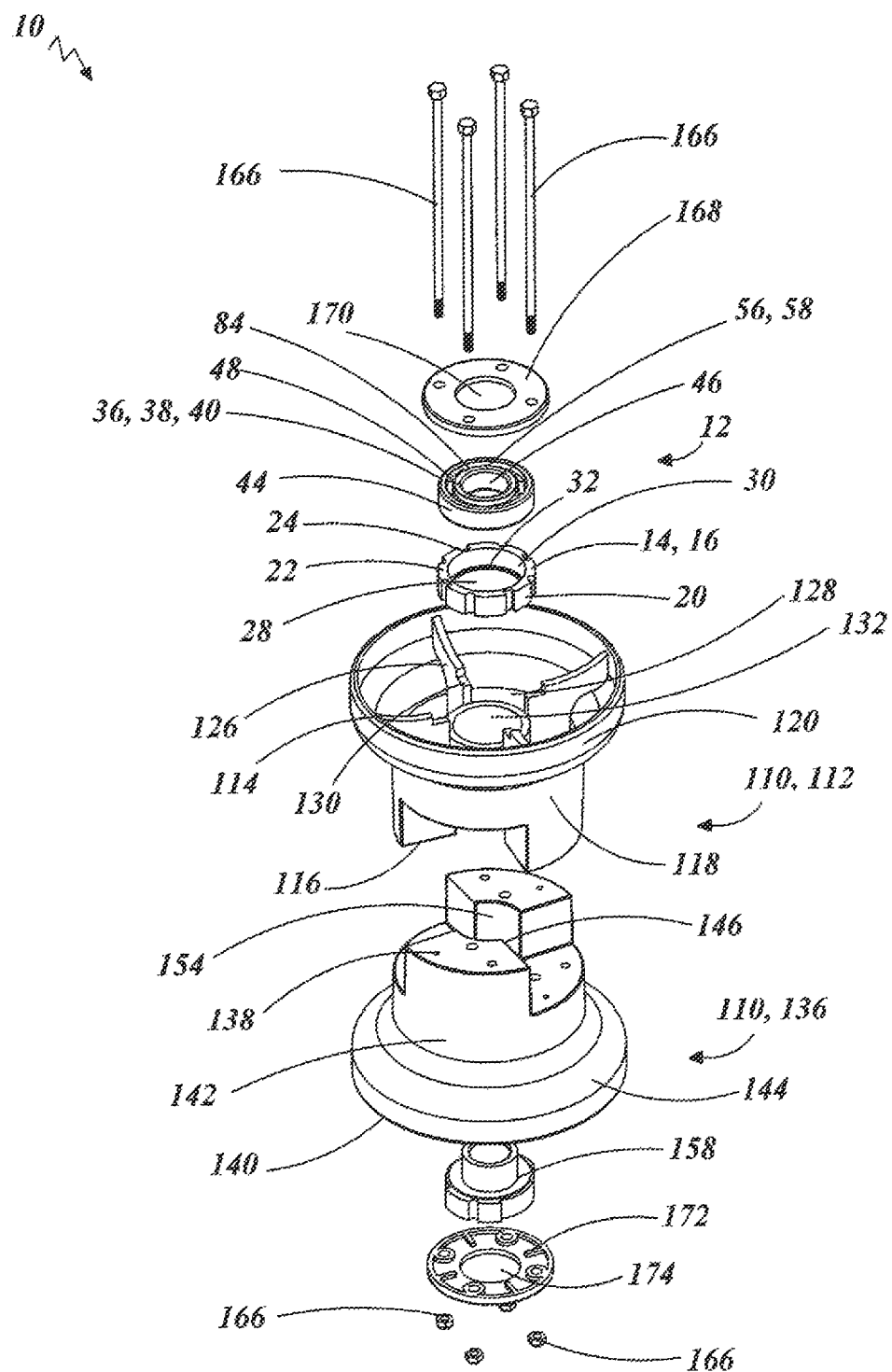
FIG. 1 is an orthographic exploded view of a wheel bearing and hub system (WBHS).
Figure 2:
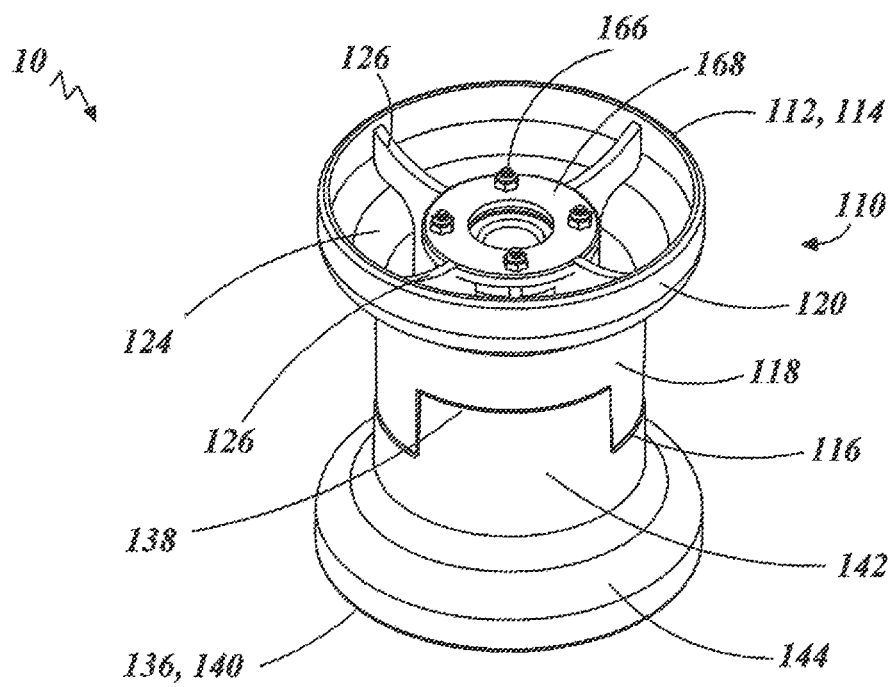
FIG. 2 is an orthographic front view the WBHS.
Figure 10:
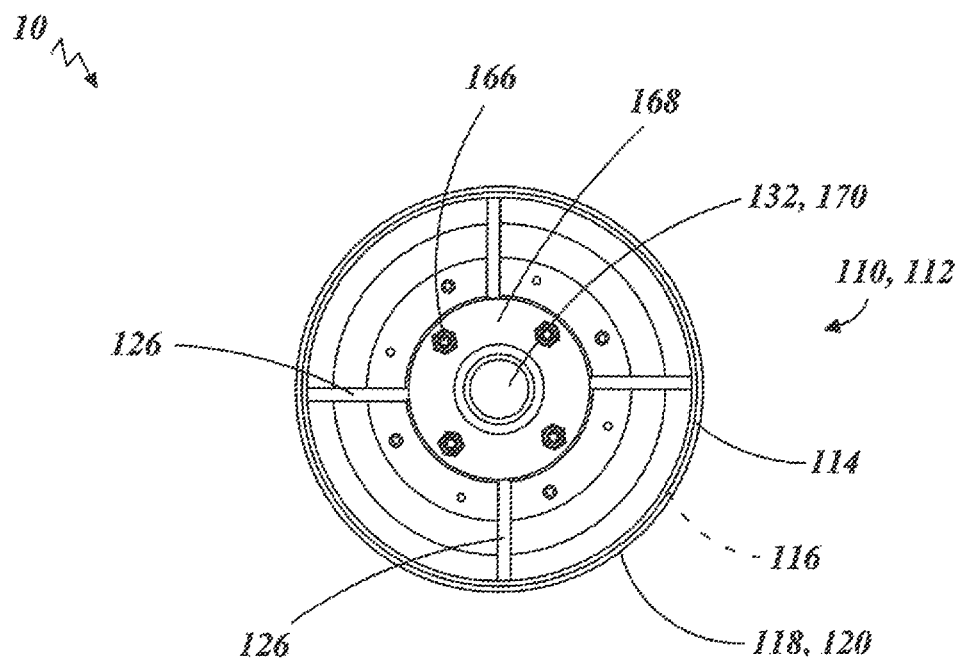
FIG. 10 is a front elevational view of the WBHS showing the wheel hub with a front cover plate.
Figure 11:
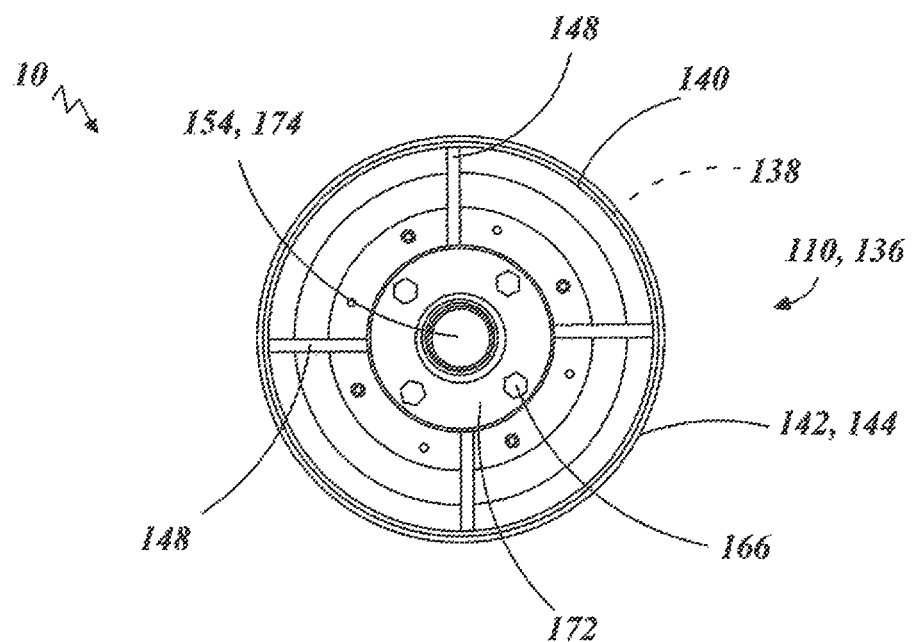
FIG. 11 is a rear elevational view of the WBHS showing the wheel hub with a rear cover plate.

In a typical configuration, a single WBHS 10 is located at the front of one wheel, as shown in FIGS. 1, 3 and 10. When the one wheel hub 110 consists of a front member 112 and a rear member 114, the securement of the WBHS 10 is designed to correspond with and also secure the two members of the wheel hub together. If desired, or required, two WBHSs 10 can be utilized on one wheel hub 110, with one WBHS 10 on the front member and one WBHS 10 on the rear member 114 (not shown). The securement design utilizing the bolts 166 and nuts allows the use of two WBHSs 10 to be easily accomplished.

Optionally, and preferably, when a single WBHS 10 is utilized at the front of a wheel hub, the rear attachment member 158 is utilized. As shown in FIG. 3, the rear attachment member 158 has slots 160 and an opening 162 that correspond to the slots 130,152 and openings 132,154 on the wheel bearing assembly 12 and wheel hub 110. The slots 160 interface with slots on the wheel hub and allow the rear member 158 to be placed within a rear member seat 150 and maintained therein. The bolts 166 that are inserted into and through the WBHS 10 on the front continue on through to the rear of the wheel hub 110. The bolts 166 are inserted into and through the openings 162 on the rear attachment member 158. A nut is then attached to each bolt 166, thereby securing both the WBHS 10 and the rear attachment member 158 onto the wheel hub 110. When a two-piece wheel hub is used, both the front member 112 and the rear member 114 are secured together with the WBHS 10, the bearing assembly 12 and the rear attachment member 158.

While the invention has been described in detail and pictorially shown in the accompanying drawings it is not to be limited to such details, since many changes and modification may be made to the invention without departing from the spirit and the scope thereof. Hence, it is described to cover any and all modifications and forms which may come within the language and scope of the claims.

The invention claimed is:

1. A wheel bearing and hub system (WBHS) that functions in combination with a vehicle wheel to facilitate the rotation of a vehicle wheel, tire and axle, wherein said WBHS is comprised of:
   a) a wheel bearing assembly with:
      1) an outer member that is dimensioned to be inserted and secured into said wheel hub wherein said outer member having a rear surface, an outer perimeter surface having a plurality of U-shaped slots and a plurality of square-shaped slots, and an opening having a perimeter surface and a perimeter flange, and
      2) an inner member that is secured within the opening on said outer member, with said inner member kept from continuing through said outer member by means of the perimeter flange on said outer member opening, wherein said inner member having:
         a)) an outer race with a front surface, a rear surface, an outer perimeter surface, an inner perimeter surface, and a stepped section,
         b)) an inner race having a front surface, a rear surface, an outer perimeter surface, an inner perimeter surface, and an opening,
         c)) a bearing channel that circumvents said inner member of said wheel bearing and hub system between said outer race and said inner race, and maintains a plurality of ball bearings and a retainer, wherein the ball bearings allow said inner race to rotate,
         d)) a front channel cover with an outer surface, an inner surface and a circular slot into which is placed a metallic ring, wherein said front channel cover is press fit onto and over said bearing channel on the front,
         e)) a rear channel cover with an outer surface, an inner surface, and a circular slot into which is placed a metallic ring, wherein said rear channel cover is press fit onto and over said bearing channel on the rear, and
   b) a wheel hub comprising a front member and a rear member, wherein said front member has a front surface, a rear surface, an outer perimeter surface, and a front flanged section having a cavity therein, wherein located at the substantial center within the cavity is a bearing assembly seat with four radial arms that extend from the assembly seat to an inner surface of the cavity, wherein circumventing the assembly seat are slots and an opening that correspond to the slots and openings on said wheel bearing assembly outer member, wherein said rear member is a mirror image of said front member and said front and rear members are fitted together by means of interfacing the rear surface of said front member to the front surface of said rear member, wherein said rear member has a front surface, a rear surface, an outer perimeter surface, and a rear flanged section having a cavity therein, wherein located at the substantial center of the cavity is a rear attachment member seat with four radial arms that extend from the attachment member seat to an inner surface of the cavity, wherein circumventing the attachment member seat are slots and an opening that correspond to the slots and opening on said front member, wherein said wheel bearing assembly is dimensioned to fit into the bearing assembly seat with said assembly seat slots corresponding with and fitting into the square-shaped slots on said outer member, and said assembly seat openings aligned with the U-shaped slots on said outer member, wherein a front cover plate is placed on the front surfaces of said wheel bearing assembly, wherein said front cover plate has slots that interface with the radial arms within said front member cavity and openings corresponding to the U-shaped slots on said bearing assembly outer member, wherein a rear cover plate is placed on a rear surface of said rear attachment member, wherein said rear cover plate has slots that interface with the radial arms within said rear member cavity and openings that correspond to the openings in said rear attachment member, wherein a bolt is inserted sequentially into and through the openings on said front cover plate, the U-shaped slots on said bearing assembly outer member, said hub front member, said hub rear member, said rear attachment member, and the openings on said rear cover plate, wherein a nut is secured onto an end of each bolt, thereby securing said WBHS together, wherein an axle is inserted into and secured within said inner member opening on said wheel bearings assembly, wherein said ball bearing circumnavigate within the channel, thereby facilitating the rotation of said WBHS and said wheel hub with the rotation of the axle.

2. The wheel bearing and hub system as specified in claim 1 wherein said wheel bearing assembly is circular.

3. The wheel bearing and hub system as specified in claim 1 wherein said outer member is made of metal.

4. The wheel bearing and hub system as specified in claim 1 wherein the metal is an alloy.

5. The wheel bearing and hub system as specified in claim 1 wherein said inner member is made of metal.

6. The wheel bearing and hub system as specified in claim 5 wherein the metal is stainless steel.

7. The wheel bearing and hub system as specified in claim 1 wherein the ball bearings are made of stainless steel.

8. The wheel bearing and hub system as specified in claim 1 wherein the ball bearings within said inner race produce a stainless steel on stainless steel interface.

9. The wheel bearing and hub system as specified in claim 1 wherein said inner member is secured within the opening on said outer member by press-fit.

10. The wheel bearing and hub system as specified in claim 1 wherein said hub is made of a material selected from the group consisting of plastic, metal or a composite material.

11. The wheel bearing and hub system as specified in claim 1 wherein a single WBHS is secured onto the front of a vehicle wheel.

12. The wheel bearing and hub system as specified in claim 1 wherein two WBHSs are utilized on a vehicle wheel, with one WBHS secured onto the front and one WBHS secured onto the back.

13. The wheel bearing and hub system as specified in claim 1 further comprising a rear attachment member that is located on the rear of a vehicle wheel, wherein the rear attachment member is equally dimensioned to said WBHS and has slots and openings, wherein the slots interface with slots on the wheel and allow the rear member to be placed within a rear member seat and maintained therein, wherein the bolts that are inserted into and through said WBHS on the front of a wheel continue through to the rear of the wheel, wherein the bolts are inserted into and through the openings on the rear attachment member, wherein a nut is attached onto each bolt, thereby securing both said WBHS and the rear attachment member onto the vehicle wheel.

* * * * *